May 31, 1932.  D. J. STEWART  1,860,631
MOTOR CONTROL MECHANISM
Filed April 7, 1927

INVENTOR
Duncan J. Stewart
BY
ATTORNEYS

Patented May 31, 1932

1,860,631

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

MOTOR CONTROL MECHANISM

Application filed April 7, 1927. Serial No. 181,661.

My invention is directed to improvements in control systems for electric motors and has more particular reference to a system in which both the starting and stopping of the motor is controlled by a common means which governs the operation of the motor switch.

Where such a common means is employed for controlling the closing and opening of the motor switch to initiate and terminate each operating cycle of the motor, it is desirable to prevent said control means from being maintained in starting position at the time when the operation of the motor is to be terminated. Damage to the motor and the parts operated thereby by failure to open the motor switch at the proper time may thus be avoided.

The primary object of the invention is therefore to provide in combination with an electric motor a novel means for controlling the starting of the motor so that the motor cannot be restarted in operation or its rotation continued until after it has come to rest or substantially so following the preceding operating cycle.

A more detailed object is to provide a novel control mechanism for starting and stopping an electric motor including an electromagnetically actuated switch and a switch in the control circuit for the magnet, which switch is adapted to be actuated by the centrifugal action in the rotation of said motor to render said electromagnetic switch inoperative while the motor is running at normal speed.

Other objects of the invention will become apparent from the following detailed description taken in connection with the accompanying drawings, in which.

Figure 1:
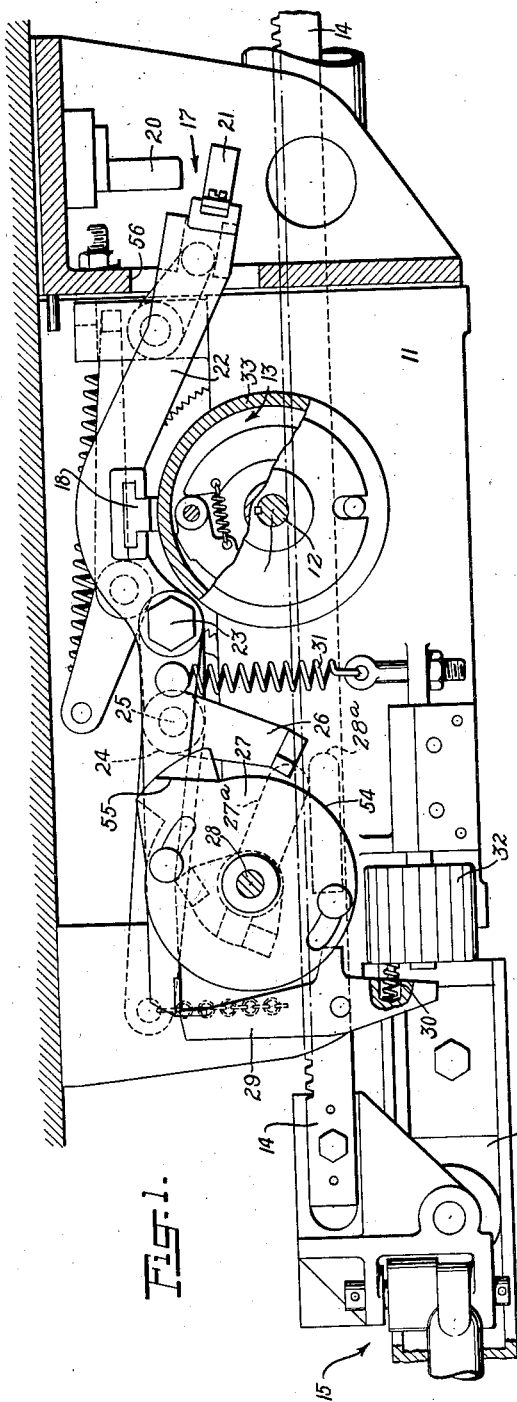
Figure 1 is a fragmentary sectional view of a power driving unit for a door operator equipped with a motor control mechanism embodying the features of my invention.
Figure 3:
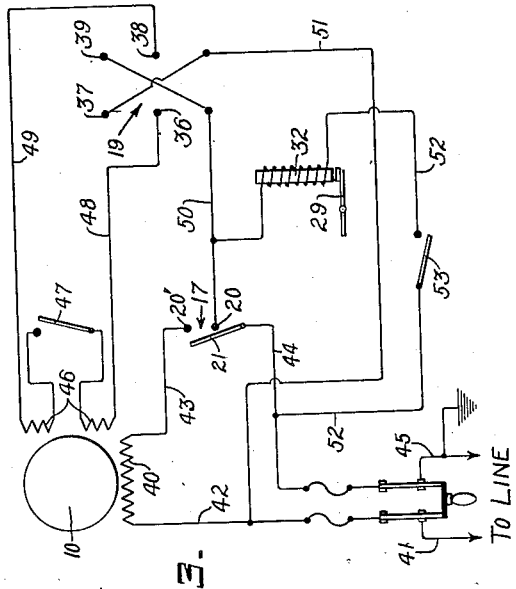
Fig. 3 is a theoretical wiring diagram showing an electric motor and the control circuits therefor.

The objects of the invention thus generally stated, together with other and ancillary advantages are obtained by the construction and arrangement illustrated in the accompanying drawings forming part hereof and hereinafter fully described. It is contemplated, however, that various changes in the construction and arrangement employed may be made by those skilled in the art without departing from the spirit and scope of the invention as expressed in the appended claims.

The invention is illustrated in the drawings as applied to a control of a single phase induction motor for driving a power driven door operator of the type disclosed in the application of Howard D. Colman, Serial No. 166,086, filed February 5, 1927. Accordingly, this application of the invention will be described herein. In this embodiment, the motor 10 is mounted on a main frame structure 11 and its shaft 12 is connected by a clutch 13 and a suitable speed reduction gearing (not shown) to a rack bar 14 for reciprocating a travelling car 15 along a trackway 16. The car 15 may be connected to a door to be operated, the arrangement being such that the door will be closed upon movement of the car to a limiting position in one direction and opened upon movement of the car to a limiting position in the opposite direction.

The control mechanism for the motor is arranged in the present instance to cause operation of the motor alternately in opposite directions through successive cycles of a predetermined length. To this end, the mechanism is operable under manual control to close a main motor switch 17 and thereby initiate an operating cycle which is terminated automatically by the mechanical operation of said switch and a brake 18. The direction of rotation of the motor in each cycle and therefore the direction of movement of the doors to be operated is determined by the usual reversing switch 19.

The motor switch 17 shown herein comprises a pair of contacts 20 stationarily mounted on the frame 11 and a movable connecting member 21 carried on the rear end of a control lever 22. This lever is pivotally supported by stud 23 on a yoke member 24 which is pivoted at 25 on the frame 11 and which has a follower arm 26 positioned to be operated upon by a cam device 27. The cam device is mounted on a shaft 28 which has a lost motion connection with a rack bar 14 so as to be oscillated in opposite directions near the end of each door operating cycle. This lost motion connection may comprise an arm 27ª on the shaft 28 adapted to be engaged as the car 16 approaches either limit of its travel by a cam 28ª rigid with the rack bar 14.

Pivoted on the frame 11 is a latch 29 which is adapted to be swung by a spring 30 in beneath the forward end of the control lever 22, thereby holding said lever raised in releasable position against the action of a strong spring 31. The lower end of the latch constitutes the armature of an electromagnet 32 which when energized serves to withdraw the latch, thereby tripping the lever 22.

The brake 18 may comprise a block of friction material mounted on the lever 22 in position to work against the periphery of a clutch drum 33 under the action of the spring 31.

Figure 2:
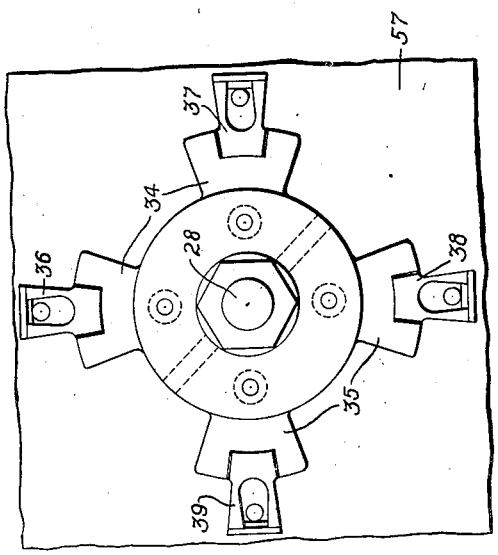
Fig. 2 is a view of a reversing switch used on the operator.

Rigidly mounted on the shaft 28 adjacent the cam device 27 are two radially extending connector plates 34 and 35 (Fig. 2) insulated from each other and adapted to engage with stationary spring contacts 36, 37, 38 and 39 on an insulating plate 57. When the cam shaft 28 is positioned as shown in Fig. 2, the plate 34 connects the contacts 36 and 37 and the plate 35 connects the contacts 38 and 39. In the other position of the cam shaft, the contacts 37 and 38 are connected by the plate 34 while the contacts 36 and 39 are connected by the plate 35. The plates 34 and 35 and the contacts 36, 37, 38 and 39, it will be observed, constitute the reversing switch 19.

Referring to the wiring diagram, the main field 40 of the motor is connected to an alternating current power line 41 by a conductor 42 and to one contact of the switch by a conductor 43. The switch member 21 is connected by a conductor 44 to the other power line 45.

As is common practice in the construction of single phase induction motors, a starting field 46 is provided in series with which is interposed a switch 47 which is intended to be opened to cut out the starting field after the motor has attained a predetermined speed and torque after being started. This switch is usually associated with the rotor of the motor so as to be opened by centrifugal action after the motor has started and to be closed automatically when the motor is at rest or substantially so. The starting field is connected to the contacts 36 and 38 of the reversing switch by conductors 48 and 49.

The reversing switch contact 39 is connected to a contact 20 of the main switch 17 by a conductor 50 while the contact 37 is connected to the power line 41 by a conductor 51. Thus, it will be seen that the connection of the starting field to the power lines is governed by the main switch 17 and that the connection between the starting field and the power lines will be reversed upon each oscillation of the cam shaft 28.

The latch magnet 32 for controlling the starting of the motor is interposed in a conductor 52 which leads from the conductor 50 to the power line 45. This circuit also includes a switch 53 for controlling the closure of the latch magnet circuit. Preferably, this latter switch is of the push button type.

The operation of the control mechanism in each operating cycle of the motor is as follows, assuming the parts to be positioned initially as shown in Figs. 1 and 2. Under these conditions the main motor switch 17 would be open, the brake would be applied to the drum 33, the switch 47 would be closed because the motor is at rest and contacts 36 and 38 would be connected respectively with contacts 37 and 39. Now, by closing the switch 53, the energizing circuit for the latch magnet is established as follows: From the power line 45, conductor 52, switch 53, magnet 32, conductor 50, contacts 39 and 38, conductor 49, starting field 46, switch 47, conductor 48, contacts 36 and 37, conductor 51 to the power line 41. Energization of the magnet 32 withdraws the latch 29 thereby allowing the spring to swing the control lever 22 about the stud 23 as a pivot center, the stud being at this time held stationary by reason of the engagement between the follower 26 and a circumferential portion 54 of the cam device 27. This movement of the lever releases the brake and closes the main motor switch 17 which connects the main motor field to the power lines and also establishes an energizing circuit for the starting field 46 as follows: From the power line 45 through the conductor 44, switch 17, conductor 50, contacts 39 and 38, conductor 49, starting field 46, switch 47 which is still closed, conductor 48, contacts 36 and 37, conductor 51 to the power line 41. Thus, the motor is started in a direction corresponding to the position of the reversing switch and rotation thereof causes the rack bar 14 to be moved. When the speed of the motor reaches the predetermined point, the centrifugal force acting on the movable contact element of the switch 47 will be sufficient to overcome the tendency of the switch to remain closed. Opening of this switch breaks the circuit for the starting field.

When the slack of the lost motion connection between the rack bar 14 and the cam shaft 28 has been taken up by a predetermined movement of the rack bar, the cam shaft will be oscillated in one direction or the other to change the reversing switch connections for the next cycle of operation. This does not effect the operation of the motor, for the starting field at this time is inoperative. This oscillation of the cam shaft 28 causes an inclined surface 55 of the cam device to actuate the follower 26 to raise the stud 23. This raises the forward end of the lever 22 about a point 56 as a fulcrum and against the action of the spring 31, the latch being thereby allowed to swing in beneath the lever 22 because the magnet 32 is at this time deenergized, the switch 47 being held open by centrifugal force. Thus the lever 22 is reset for the next door operating cycle. Thereafter the cam device releases the follower 26 and the spring 31 swings the rear end of the control lever downwardly, the upper end of the latch 29 being the fulcrum during this movement. In this way the main motor switch is opened quickly and the brake is applied to the drum 33, the motor being thereby stopped and the control mechanism is left in proper position for starting the motor when the magnet is again energized.

Attention is directed to the fact that with the control mechanism above described the motor cannot continue to operate in one direction longer than the time required to complete one operating cycle. That is to say, the main motor switch will always be opened to stop the motor at a predetermined point in each cycle and cannot again be closed to restart the motor until the motor has come to rest. This result is accomplished as above described by connecting the magnet 32 in a control circuit leading through the centrifugally operated switch 47 in the starting field circuit which switch is responsive to the speed of the motor and which, being common to the starting field circuit and to the magnet control circuit, renders the starting field inoperative while the motor is running and at the same time prevents energization of the latch magnet. Therefore, the danger of damaging the motor or breaking parts of the operator by failure of the latch 29 to operate in stopping the motor is avoided. For instance, if it were possible to maintain the magnet 32 energized as by holding the switch 53 closed, the latch 29 would not catch the lever 22 when the latter is released by the cam device, the result being that the brake would not be applied to arrest the motion of the operating mechanism and the main motor switch would not be opened. Under these conditions the operating mechanism would be stopped by sudden impact between the car 15 and the frame supporting the trackway 16. However, this danger is effectually prevented by means of the switch 47. Thus, if the manually controlled switch 53 is maintained closed, the power operator will be stopped in the usual way and will be restarted in the opposite direction as soon as the motor has slowed down sufficiently to allow the switch 47 to become closed. In other words, the centrifugally acting switch operates automatically to prevent effective energization of the control magnet 32 except when the car 16 has reached one of its limiting positions following operation of the means by which the cycle of the operator is terminated. In this way, the successive cycles which cause movement of the car alternately in opposite directions may be initiated by the same manipulation of a single control device, namely the switch 53.

I claim as my invention:

1. The combination with an electric induction motor having main and starting field windings, of a switch for controlling the application of electrical energy to said windings, a lever for closing and opening said switch to start and stop said motor, a second switch in the circuit for said starting field adapted to be opened to interrupt the starting field circuit when the motor has attained a predetermined speed after starting, and a magnet controlling the movement of said lever, said magnet being connected in series with said starting field.

2. The combination with an electric motor, of a main motor switch, means operable under manual control to cause said switch to be closed whereby to start said motor, automatically operable means to cause said switch to be opened whereby to terminate the operating cycle of said motor after a predetermined period of operation, and means operable to prevent operation of said manual controlled means until after said switch has been operated by said automatically operable means, said last mentioned means including a switch responsive to the speed of the motor and operable by centrifugal action.

3. The combination with an electric motor, of a switch associated with said motor and adapted to be closed normally when the motor is at rest and to be opened when the motor is running above a predetermined speed, a switch controlling the application of electrical energy to the motor, and operating means for said motor switch including an electromagnet interposed in series with said first mentioned switch so as to be capable of being energized only when said motor is at rest or rotating below said predetermined speed.

4. The combination with an electric motor, of a switch controlling the application of electrical energy to said motor, means controlling the closure only of said switch including an electromagnet, means providing an energizing circuit for said magnet including a switch operated by said motor and adapted to be opened when the motor is running above a predetermined speed, and means operable independently of the condition of said control circuit for opening said switch to stop the motor.

5. The combination with an electric motor having main and starting field windings, of a switch for controlling the application of power to said windings, an electromagnet controlling the closure of said switch, independent means controlling the opening of said switch to stop the motor and a centrifugally operable switch common to the energizing circuits for said starting field and said electromagnet.

6. The combination with an electric motor having main and starting field windings, of a main switch for connecting both of said windings to a source of electric current, a centrifugally operable switch responsive to the motor speed interposed in series with said starting winding, a reversing switch controlling the direction of current flow to said starting winding, an electromagnet controlling the closure of said main switch, means operable independently of said electromagnet for controlling the opening of said main switch, a switch for controlling the energization of said magnet, and means providing an energizing circuit for said magnet which includes in series relation the magnet winding, said reversing switch, said control switch and said centrifugally operable switch.

7. The combination with a motor having a main field winding and a starting winding, of a switch controlling the application of current to said windings, an electromagnet adapted when energized to cause said main switch to be closed, means operable independently of said electromagnet for controlling the opening of said switch, a switch controlling the energization of said electromagnet, an automatic switch normally closed when the motor is at rest and adapted to be opened by centrifugal action when the motor is running above a predetermined speed, and means providing an energizing circuit for the winding of said magnet and including in series relation said starting winding, said automatic switch and said control switch.

8. The combination with an electric motor of a switch governing the initial application of electrical energy to said motor, an electromagnet adapted when energized to effect closure of said switch, a control switch governing an energizing circuit through said electromagnet for starting said motor, and automatically operating means for maintaining said electromagnet deenergized in the subsequent rotation of the motor above a predetermined speed comprising a switch in said energizing circuit responsive to the speed of said motor and adapted to be held open while the motor is rotating above said predetermined speed.

9. The combination with an electric motor of a switch governing the application of electrical energy to said motor, a releasable member held in set position while the motor is at rest and adapted when tripped from such position to close said switch, a latch adapted when in active position to hold said member in set position and when withdrawn to inactive position to trip said member, control means by which said latch may be withdrawn to initiate the operation of the motor, means actuated by the motor for resetting said member relative to said latch, and means acting automatically during the operation of said resetting means to render said withdrawing means ineffectual and thereby maintain said latch in active position.

10. The combination with an electric motor and a part to be moved in successive cycles from one limiting position to another, of a switch controlling the application of current to the motor to start the same in each cycle, a member for actuating said switch tending to move to a switch-closing position, a latch adapted when in active position to hold said member in switch-open position, an electromagnet adapted when energized to withdraw said latch to inactive position and thereby permit the member to close said switch and initiate a cycle of operation of the motor, means actuated by power derived from the motor during said cycle to reset said member and thereby restore the same to the control of said latch, a control switch governing the energization of said electromagnet and means actuated by the motor and acting during the operation of said resetting means to prevent withdrawal of said latch to inactive position by energization of said electromagnet through the closure of said control switch.

In testimony whereof, I have hereunto affixed my signature.

DUNCAN J. STEWART.